US006925611B2

(12) United States Patent
SanGiovanni

(10) Patent No.: US 6,925,611 B2
(45) Date of Patent: Aug. 2, 2005

(54) NAVIGATIONAL INTERFACE FOR MOBILE AND WEARABLE COMPUTERS

(75) Inventor: John SanGiovanni, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 623 days.

(21) Appl. No.: 09/773,451

(22) Filed: Jan. 31, 2001

(65) Prior Publication Data

US 2002/0101458 A1 Aug. 1, 2002

(51) Int. Cl.[7] .................................................. G06F 3/00
(52) U.S. Cl. ........................ 715/834; 715/841; 715/845; 715/863
(58) Field of Search ................................. 715/834, 841, 715/721, 845, 863; 345/805, 810, 834, 841, 806, 807, 808, 820, 825, 828, 829, 835, 839, 843, 845, 847, 850, 863; 700/18

(56) References Cited

U.S. PATENT DOCUMENTS

| | | | |
|---|---|---|---|
| 5,627,567 A | | 5/1997 | Davidson |
| 5,764,794 A | | 6/1998 | Perlin |
| 5,798,760 A | * | 8/1998 | Vayda et al. ................. 345/834 |
| 5,933,141 A | * | 8/1999 | Smith .......................... 345/768 |
| 6,031,525 A | | 2/2000 | Perlin |
| 6,072,475 A | | 6/2000 | Van Ketwich |
| 6,104,400 A | * | 8/2000 | Halachmi et al. ........... 345/854 |
| 6,181,344 B1 | * | 1/2001 | Tarpenning et al. ........ 345/863 |
| 6,320,496 B1 | | 11/2001 | Sokoler et al. |
| 6,441,753 B1 | | 8/2002 | Montgomery |
| 6,448,987 B1 | * | 9/2002 | Easty et al. .................. 345/834 |
| 6,473,069 B1 | | 10/2002 | Gerpheide |
| 6,538,635 B1 | * | 3/2003 | Ringot ......................... 345/156 |
| 6,538,663 B2 | * | 3/2003 | Kamei .......................... 345/635 |
| 6,556,222 B1 | * | 4/2003 | Narayanaswami .......... 345/786 |
| 2002/0003469 A1 | | 1/2002 | Gupta |
| 2002/0101441 A1 | | 8/2002 | SanGiovanni |

OTHER PUBLICATIONS

Fukomoto, Masaaki; Tonomura, Yoshinobu, May 1998, Wireless Fingering: A Body–Coupled Wearable Keyboard; Transactions of Information Processing Society of Japan; pp. 1423–1430; Tokyo, JP.

(Continued)

Primary Examiner—Ba Huynh
Assistant Examiner—Nhon Nguyen
(74) Attorney, Agent, or Firm—Perkins Coie LLP

(57) ABSTRACT

The navigational interface allows a user to control computer operations and input text into applications running on the computing system with a single input device. The navigational interface operates by receiving selection signals from the input device. The navigational interface includes an input device, a navigational interface interpretation module having a sensor pattern, and a control display providing feedback of the navigational interface interpretation module operations. The sensor pattern is radially divided into a central sensory portion, a petals sensory portion divided into sensory petals, and a circumferential sensory portion. Each sensory portion references an information element. The information elements are associated with tasks to be performed in the computing system. The tasks might be computer control operations, application selection, application operation, or inputting and editing of textual characters into various applications running on the computing system. The information elements are selected by a selection stroke on the sensory portions and sensory petals of the sensor pattern. The selection stroke is defined by information in the selection signal, which is transmitted pursuant to a user input stroke. Tasks are performed through recognization of the selection signal by the navigational interface interpretation module. Following task execution, the information elements associated with the sensor pattern are functionally updated according to the executed task.

5 Claims, 10 Drawing Sheets

OTHER PUBLICATIONS

Leung, Ying; Pilgrim, Chris; Mouzakis, Kon, Aug. 1999, Pointing Accuracy with Mobile Pen–Based Devices for On–The–Move Applications; pp. 218–222; The 8th International Conference on Human–Computer Interaction; Munich, Germany, Aug. 22–26, 1999.

Thomas, Bruce; Grimmer, Karen; Makovec, Dan; Zucco, Joanne; Gunther, Bernard, Oct. 1999, Determination of Placement of a Body–Attached Mouse as a Pointing Input Device for Wearable Computers; pp. 193–194; 3d International Symposium on Wearable Computers; San Francisco CA, Oct. 18–19, 1999.

U.S. Appl. No. 10/845,646, filed May 2004, SanGiovanni.

Kawachiya, Kiyokuni et al., "NaviPoint, An Input Device for Mobile Information Browsing," Conference on Human Factors in Computing Systems, Apr. 18–23, 1998, Los Angeles, California (pp. 1–8).

Mohageg, Michael, "User Interface Design in the Post–PC Era," The 8th International Conference on Human–Computer Interaction, Aug. 22–26, 1999, Munich, Germany (pp. 1137–1142).

Rieck, Anke, Aspects of User Interfaces in Mobile Environments); Workshop IMC '96, Information Visualization and Mobile Computing, Feb. 26–26, 1996, Rostock, Germany (11 pages).

Landay, James A., et al., "User Interface Issues in Mobile Computing," Fourth Workshop on Workstation Operating System, Oct. 14–15, 1993, Napa, California (8 pages).

* cited by examiner

CONTINUED
FROM FIG.7A

NAVIGATIONAL INTERFACE FOR MOBILE AND WEARABLE COMPUTERS

TECHNICAL FIELD

The invention relates generally to a user interface providing interaction between a user and a computing system. More particularly, the invention relates to a navigational interface for control operation and textual input into a computer.

BACKGROUND OF THE INVENTION

As computers have become more complex, user interfaces have had to adapt to allow the user to control the operations of the computer. Initially, the interface used was a command line interface, which utilized a series of typed commands formatted in a specific syntax familiar to the computer and eventually learned by computer users. This interface was eventually replaced by the Graphical User Interface ("GUI"), which allows users to point to objects, buttons, and windows displayed like items on a desk. Initially, interaction between the GUI and a user was accomplished through a light pen, a pen-based computer control requiring the user to select and highlight objects on the screen by touching the light to the object on the screen. However, this implementation had its disadvantages because, by design, the user's hands and the light pen would obscure a portion of the screen from the user's own view. This and other disadvantages led to the development of the mouse, an interface control separate from the keyboard, that controlled a pointer on the GUI for selecting and highlighting objects, buttons, and windows.

The growth of the personal digital assistant ("PDA") and wearable computer markets are associated with similar problems realized in the larger-scale computing systems. As PDA technology continues to rapidly advance with respect to the size of PDA electronics and batteries, the size of handheld and mobile devices becomes more dependent upon the user interface utilized.

The current most practiced method of interaction between a user and a personal digital assistant ("PDA") is a stylus-based GUI. In stylus-based interaction, the user holds the device in one hand and the stylus in the other. A stylus-based GUI enables a user to take full advantage of the PDA by allowing the user to navigate through applications operating on a computing system, control operations associated with those applications, and input text while using only one selection device—the stylus. In short, a separate keyboard or other input device is not needed.

While such interaction is similar to the use of a conventional pad and paper, it is not without problems. Since the stylus-based GUI is a simple derivation of the former light pen, it includes many of the same problems associated with the light pen-based GUI's. The use of a stylus obscures the portion of the display that the writing hand is covering. Further, the stylus-based GUI requires two-hand operation and typically requires the user to look at the device while using it. The stylus-based GUI must also include complex software to recognize the user's handwriting.

SUMMARY OF THE INVENTION

In accordance with this invention, the above and other problems are solved by a navigational interface operating on a computing system. The navigational interface allows a user to control computer operations and input text into applications running on the computing system with a single input device. The navigational interface operates by receiving selection signals from the input device. The navigational interface includes an input device, a navigational interface interpretation module having a sensor pattern, and a navigational display providing feedback of the navigational interface interpretation module operations. The sensor pattern contains fields that are selected in stroke fashion by selections signals transmitted from the input device pursuant to a user input stroke on the input device. Each selection signal sent from the input device is associated with at least one field of the sensor pattern. The navigational interface interpretation module recognizes each input stroke on the sensor pattern as a task to be performed in the computing system.

If the stroke is an out-return stroke, then the user has requested textual input. By requesting textual input, the navigational interface interpretation module enters a text input/editing mode. If the stroke is a drag-out, a drag-in, a dial, or a press/click stroke, then the user has requested performance of a control operation. By requesting performance of a control operation, the navigational interface interpretation module enters a control-operating mode. The control operation might be selection and activation of a particular application, operation of an already active application, operation of a desktop environment utility, operation of an operating system, or overall computer control.

In accordance with an aspect of the invention, the sensor pattern is radially divided into a central sensory portion, a petals sensory portion, and an outer, or circumferential, sensory portion. The petals sensory portion is further angularly divided into sensory petals, or portions. The petals and portions make up the fields of the sensor pattern. The central sensory portion and the outer sensory portion of the sensor pattern are separated from the sensory petals to have separate functionality. Text is entered by performance of pre-defined strokes using an input device that is working with the navigational interface to activate portions of the sensor pattern in sequence.

In accordance with one aspect of the invention, text is input by a selection stroke beginning at the central sensory portion, continuing through to one or more petals, and terminating at the central sensory portion. Specific characters are selected based upon which petal is initially referenced and which petals are thereafter referenced, if any. Specific textual characters of each petal might be presented on the navigational display of the navigational interface.

In accordance with one aspect of the invention, the outer circumferential portion of the sensor pattern is used in selecting a desired program by the user. The outer circumferential portion of the sensor pattern is presented on the navigational display as an application ring containing a plurality of application tab references. Applications are activated by a press/click stroke of a particular petal corresponding to the application tab reference. A press/click stroke is applied by a press, or click, and an immediate lift on a petal. In various aspects of the invention, an application might be an application program, a desktop environment utility, or an operating system utility. Once an application is selected, the application may be operated through application-defined tasks represented in the petals. The petals and portions of the sensor pattern change functionality based on which application (including text editors) is selected. Applications are operated by dial strokes, drag-in strokes, drag-out strokes, and out-return strokes while the navigational interface interpretation module is in the control-operating mode providing control operations for performing tasks in the application.

In accordance with one aspect of the invention, once the desired application is selected, the petals and the circumferential portion are functionally updated and the navigational display is updated to correspond to tasks of that application. The navigational display also presents at least one inner circumferential portion representing tasks for either the text editor or the application selected by the user. The petals and circumferential portions of the navigational display are continually updated to represent tasks, operations, and characters following each selection, or stroke, on the sensor pattern by the input device.

In accordance with one aspect, the present invention relates to a navigational interface having a single input device for controlling computer operation and inputting text into various applications running on a computing system. The navigational interface has a sensor pattern divided into a plurality of portions. Information is input into the computing system through the sensor pattern. Each portion on the sensor pattern is associated with one information element associated with a task to be performed in the computing system. A user inputs a request using the input device, which transmits a selection signal carrying information defining a selection stroke selecting an information element. The selection stroke is recognized by an interface interpretation module, which provides for the performance of the task represented by the information element.

In accordance with still other aspects, the present invention relates to a method of dividing a sensor pattern of a navigational interface into a plurality of portions. The sensor pattern is radially divided into a central sensory portion, a petals sensory portion, and an outer sensory portion. The petals sensory portion is angularly divided into a plurality of petals. Each of the petals and portions reference an information element selectable by a selection stroke on the sensor pattern. Each selection stroke corresponds to a user request to perform an operation in a computing system operated by the navigational interface. The navigational interface controls operations of the computing device and allows for the inputting and editing of textual characters into various applications running on the computing device. Such control and inputting ability is provided by the selection stroke selecting at least one petal on the sensor pattern. If the selection stroke is an out-return stroke, then text is input or edited in the primary active application operating through the user interface. If the selection stroke is a press/click stroke, activation of an application is executed by the navigational interface. If the selection stroke is a drag-out, a drag-in, or a dial stroke, an operation of the primary active application is executed by the navigational interface.

The invention may be implemented as a computer process, a computing system, or as an article of manufacture such as a computer program product or computer readable media. The computer program product may be a computer storage media readable by a computing system and encoding a computer program of instructions for executing a computer process. The computer program product may also be a propagated signal on a carrier readable by a computing system and encoding a computer program of instructions for executing a computer process.

The great utility of the invention is that users may interact with a computing system through a navigational interface using only one input device. The advantages of this utility become even more apparent as consumers demand smaller, faster, and easier to use computers. In particular, this invention will be of great importance to designers of personal digital assistants, handheld personal computers, mobile computers, and wearable computers. Not only does the present invention allow users to operate such devices using one hand, but it also provides for interaction while on the move.

Another great utility of the invention is that the navigational interface can be used as either a navigational interface within a graphical user interface (GUI), such as Windows® CE, or as the only user interface on the computing system. The navigational interface is designed to lead to muscle memory, thereby allowing a user to navigate through applications and input text without looking at the navigational interface navigational display.

These and various other features, as well as advantages, which characterize the present invention will be apparent from a reading of the following detailed description and a review of the associated drawings.

DETAILED DESCRIPTION OF THE INVENTION

Figure 1:
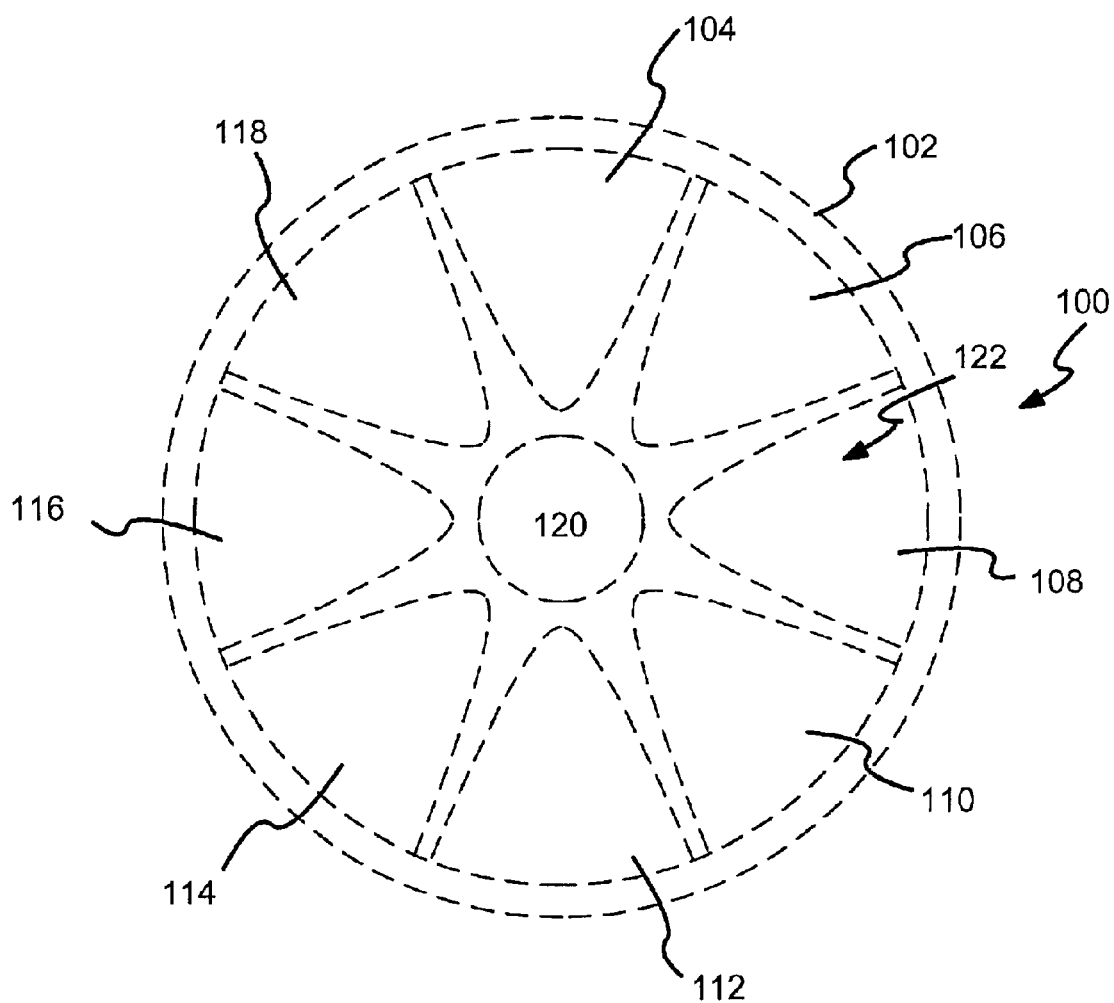
FIG. 1 shows a conceptual illustration of the graphical divisions of a sensor pattern in accordance with one embodiment of the present invention.

FIG. 1 is a conceptual illustration of a sensor pattern 100 of a navigational interface in accordance with an embodiment of the present invention. The sensor pattern 100 is divided into a predetermined array of graphical fields 102–120, or portions. The sensor pattern 100 is radially divided into a central sensory portion 120, a petals sensory portion 122 divided into sensory petals 104–118, and an outer sensory, or circumferential, portion 102. In accordance with an embodiment of the present invention, the circumferential portion 102 is located on the outermost edge of the sensor pattern 100. The petals sensory portion 122 is angularly divided into a predetermined number of graphical sensory petals 104–118. In one embodiment, the sensor pattern 100 contains eight sensory petals 104–118. In other embodiments, the sensor pattern 100 might contain any number of sensory petals 104–118. In accordance with an embodiment, the central sensory portion 120 and the circumferential portion 102 are not angularly divided by the sensory petals 104–118. In other embodiments, the central sensory portion 120 and the circumferential portion 102 might be divided by the sensory petals 104–118.

Figure 3:
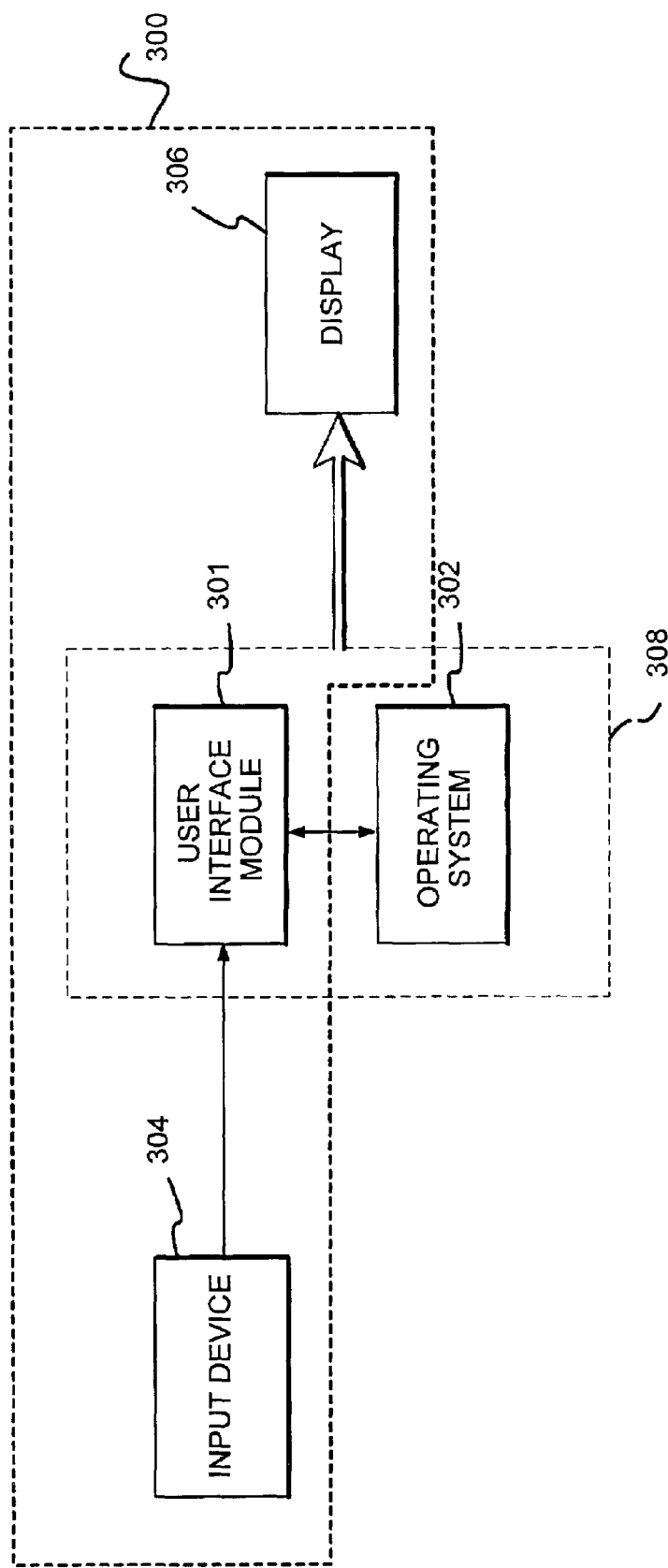
FIG. 3 shows a conceptual illustration depicting interaction between the navigational interface and a computing system.

Referring to FIG. 3, a conceptual illustration of the interaction between the navigational interface 300 and a computing system 308 is shown. In accordance with one embodiment, an operating system 302 and the navigational interface 300, which is installed under the operating system 302, are located inside a casing of the computing system 308. The computing system 308 is operably connected to a display 306. The display 306 presents a navigational display, i.e. a display pattern illustrating information elements of the navigational interface 300. Interaction between the user and the navigational interface 300 is accomplished through an input device 304, a navigational interface interpretation module 301, and the navigational display presented on the display 306.

The input device is used to detect input strokes, which are recognized by the navigational interface interpretation module 301, as selection strokes relative to the sensor pattern 100. In one embodiment, the input device, or sensory pattern device, 304 is a touchpad having sensors for detecting touch by the user at different positions on the touchpad. The sensors are located on positions of the touchpad corresponding to the portions 102–120 and petals of the sensor pattern 100. In this embodiment, an input stroke is performed by the user touching and lifting his finger on sensory portions of the touchpad. Other sensory pattern devices might be a mouse, a joystick, a touch screen or any other device that can detect input strokes or selection strokes of an input pointing element. Whether the selection stroke is performed either on (as in the case of a touchpad or touchscreen) or with the input, or sensory pattern, device 304 (as in the case of a joystick or mouse), the selection stroke device detects the positions included in the input stroke and the corresponding portions 102–120 on the sensor pattern 100.

The selection stroke relative to the sensory pattern 100 mirrors the selection stroke on the touchpad. If the user touches the touchpad on one position and immediately lifts without continuing to any other position on the touchpad, then the selection stroke is a press/click stroke. If the user touches the pad on one position and continues, or slides, to at least one other position on the touchpad, then the selection stroke, depending on the location of the other position(s), might be a drag-in, a drag-out, a dial, or an out-return stroke. The same selection strokes may be made with a mouse and a mouse button or a joystick and a button. The position of a pointer during a selection stroke may be indicated by a cursor on a display that displays the sensory pattern. Alternatively, the sensory pattern might overlay sensory portions on a touchpad or touch screen. In one embodiment, the sensors of the touchpad are arranged in a pattern identical to the sensory pattern 100 of the navigational interface 300. In other embodiments, other sensory patterns might be used, but there should be an intuitive relationship between the sensory pattern and the input, or sensory pattern, device detecting the selection strokes relative to the sensory pattern. While a number of embodiments have been described for the input device 304, any number of combinations of pads, keys, buttons, and posts might be selected as an input device 304 to the navigational interface 300.

The navigational interface interpretation module 301 interprets the input information contained in the selection stroke. The navigational interface interpretation module 301 may be designed with either software or logic. In one embodiment, the interpretation of the selection stroke relative to the sensor pattern 100 is maintained internal to the navigational interface interpretation module 301. In another embodiment, the interpretation of the selection stroke might be a separate module located on a connection between the input device 304 and the navigational interface interpretation module 301.

In accordance with one embodiment of the present invention, a selection signal is transmitted from the input device, or sensory pattern device, 304 to the navigational interface interpretation module 301 when the user inputs a selection stroke into the sensory pattern device 304. Selection stroke information in the selection signal identifies a selection stroke selecting specific portions 102–120 of the sensor pattern 100 referencing at least one specific text information or control element. Each graphical portion 102–120 references one information element associated with a task—text entry or control—to be performed in a computing system. In accordance with one embodiment, a single information element is the only information element associated with a particular task. In other embodiments, a group of information elements might be associated with one particular task. In this embodiment, selection of all the information elements associated with the task requests performance of the task. In accordance with an embodiment, a task is a command to be implemented in the computing system. In accordance with various embodiments, the task might be executed by the operating system, the application program calling the operation, the user interface through which the application is operating, or the navigational interface. In particular, each information element, when selected, requests performance of a particular task by one of the various embodiments. Additionally and in other embodiments, the information element, which is controlled by a user interface interpretation module 301, might independently provide for the execution of the particular task.

According to various embodiments, the entering and editing of text and operations associated with editing text, selection and operation of an application, including entering and editing text within an application, and computer control operations, are identified as tasks. In accordance with various embodiments, the application might be an application program, an operating system, a desktop environment defined by a user interface, or any other program operating on the operating system of a computing system 308. Immediately following start-up, or boot, of the computing system 308, the primary active application is a desktop environment prompting a user to select from various applications operating on the desktop environment. A desktop environment is an arrangement defined by the user interface controlling operations of the applications installed on the operating system 302. The desktop environment is a media through which the user may initiate computer control and application activation.

The selection stroke triggers operation of the navigational interface interpretation module 301 to perform the task associated with the information element or group of elements selected. FIGS. 6, 7A, 7B, and 8 further elaborate on modes of operation and performance of tasks by the navigational interface interpretation module 301 when a selection stroke is detected by the sensor pattern device 304, and a selection signal is relayed to the module 301.

In one embodiment, the navigational interface 300 is used in conjunction with a graphical user interface (GUI), such as Windows® CE. In this embodiment, the user controls operations of the computing system and inputs/edits text into various applications running on the computing device through the navigational interface 300 activated as part of the GUI. In another embodiment, the navigational interface 300 is the only user interface operating on the computing system.

Regardless of whether the navigational interface 300 is used in conjunction with another GUI or solely as the user interface on the computing system, in one embodiment of the present invention all tasks, including, but not limited to, text inputting/editing and control of computer operations, are accomplished through a single input device. In other embodiments, the user might use a plurality of input devices. In either embodiment, the user controls operations of the computing system and inputs/edits text into various applications running on the computing system by performing input or selection strokes on certain portions 102–120 of the sensor pattern 100. The input strokes are recognized by the navigational interface 300 as a selection stroke on the sensor pattern 100. As described earlier, the selection stroke identifies certain tasks—text entry or control—to be implemented in the computing system.

In accordance with one embodiment, a user interacts with the navigational interface 300 through a single input device 304 to control all computer operations and input text. A display 306 provides visual feedback to the user of operations performed using the navigational interface 300. Further discussion illustrating the functional operations performed by the navigational interface 300 during interaction with the computing system 308 is described in FIG. 5 (below).

Figure 2:
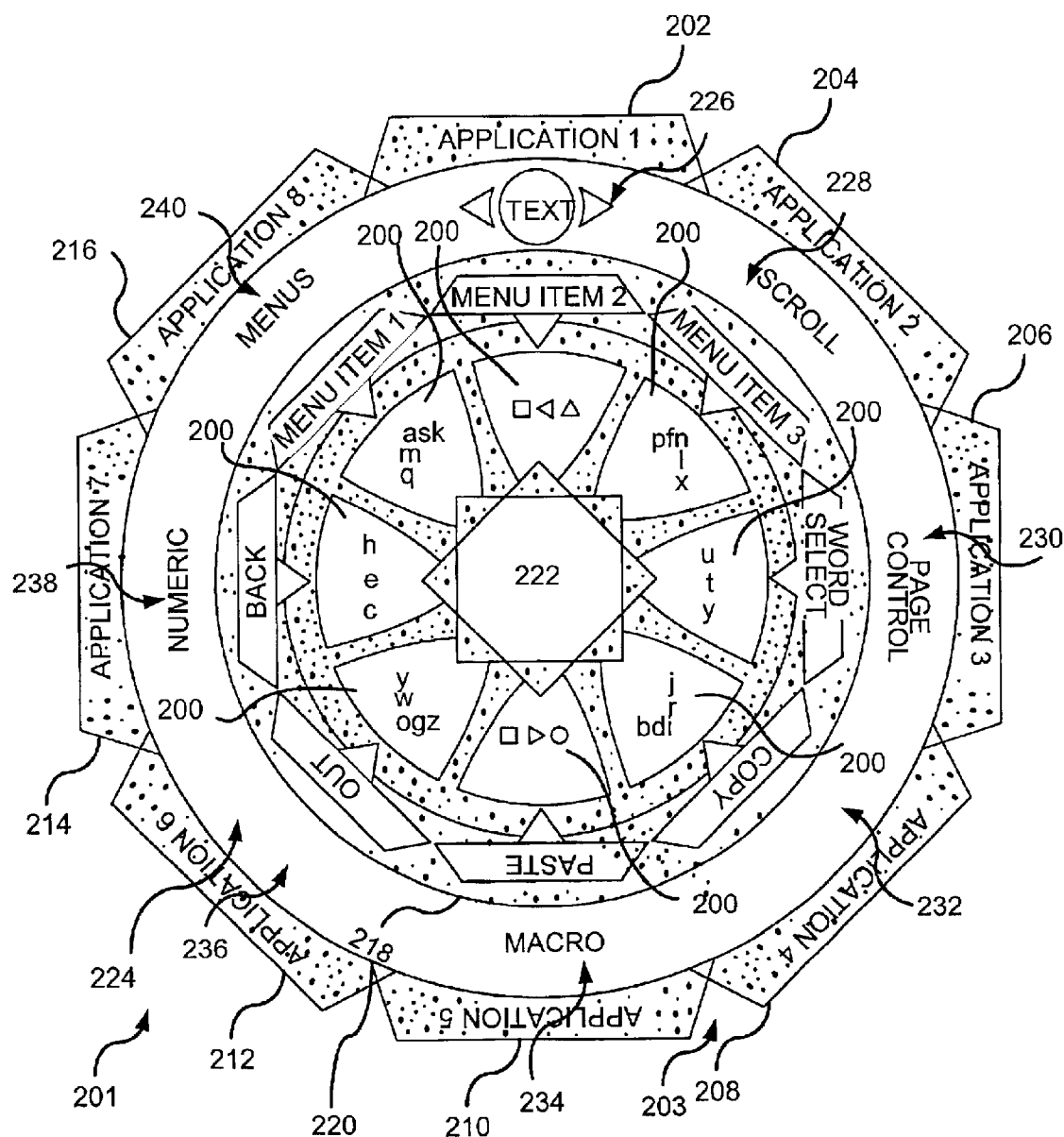
FIG. 2 illustrates one embodiment of the arrangement of information elements associated with the sensor pattern of FIG. 1.

Referring to FIG. 2, an embodiment of a navigational display, or display pattern, 201 of the navigational interface 300 is illustrated as dynamically defined according to a primary active application and its associated tasks. Information elements presented on the display pattern 201 are generated by the navigational interface interpretation module 301. The display pattern image is rendered by the interpretation module 301 and displayed on display 306. Information elements are associated with tasks to be performed in the computing system 308. Each information element is referenced by, or assigned to, a portion 102–120 of the sensor pattern 100.

A user requests performance of a task by selecting an information element with a selection stroke applied to the sensor pattern 100. The selection stroke, by selecting at least one information element, defines the task to be performed. The selection stroke is transmitted through a selection signal generated by the input device 304. The selection signal carries positional information of the user's input stroke corresponding to the portion 102–120 of origination, the portions 102–120 of continuation of the stroke, if in fact the selection stroke does continue, and the portion 102–120 of termination of the selection stroke.

In accordance with one embodiment, the central sensory portion 120 can only be identified as the initiation or termination of a selection stroke and not a portion identifying continuation of the selection stroke. Each portion 102–120 of the selection stroke references at least one information element defined by the navigational interface interpretation module 301. Each information element, or group of information elements, is associated with a task to be performed by the computing system 308. Receipt of the selection signal by the sensor pattern device 304 triggers operation of the navigational interface interpretation module 301 for executing the task associated with either the information element or group of information elements referenced by the portions 102–120 included in the selection stroke. Following performance of the task, the navigational interface interpretation module 301 updates the information elements presented by display 308 in the display pattern 201 to correspond to a new set of tasks defined by the primary active application operating through the user interface.

FIG. 2 shows an instance of the display pattern 201 as a text editor with a character pattern 200 in each display petal 226–240. An instance is a momentary portrayal of the information elements referenced by the sensor pattern 100 immediately prior to performance of the task associated with the selected information element, or selected group of information elements. The display pattern 201 presents a petals display portion 224 associated with the petals sensory portion 122 and having display petals 226–240, which are associated with sensory petals 104–118, a central display portion 222 associated with the central sensory portion 120, and an outer display portion, or application ring, 203, associated with the circumferential portion 102. The outer display portion is circumferentially divided into multiple circumferential parts, shown in FIG. 2 as application tabs 202–216. In the embodiment depicted in FIG. 2, the circumferential parts are divided according to each display petal 226–240. Character pattern 200 is designed and operated in accordance with the Qwickwriting™ technique taught by Kenneth Perlin in U.S. Pat. Nos. 5,764,794 and 6,031,525.

Referring to FIG. 2, applications are activated by referencing an application ring 203 containing application tabs 202–216 in accordance with one embodiment of the present invention. The application ring 203 is located on the circumferential portion 102 (FIG. 1). In particular, applications are referenced by the application tabs 204–218. Even though application tabs 204–218 are located on the outer circumferential portion 102, applications are selected through the petal (such as 104–118) corresponding to the application tab (such as 204–218) of the desired application. As described below in FIGS. 6 and 7, a user selects to activate an application through a press/click stroke on a sensory petal 104–118, which, in accordance with one embodiment, might be presented on the display pattern 201 as a display petal 226–240. A press/click stroke is applied by a press, or click, and an immediate lift on a sensory petal 104–118. In accordance with one embodiment, application tabs 202–216 might also include links to desktop environment and operating system utilities.

The navigational interface interpretation module 301 associates each information element with a petal 104–118 on the sensor pattern 100. Information elements are displayed by the display pattern 201 and selected through the sensor pattern 100 using the user input device 304 as earlier described. Application tabs 202–216 and character pattern 200 are displayed as information elements on the display pattern 201. The information elements may be associated with a character, a task, a function, a link to an application executable file, or any other functionality associated with computer control and applications operated thereon. Following the performance of a selected task, sensory petals 104–118 represent new functional operations and display petals 226–240 presenting interface displays updated with information elements pertaining to functional operations of the active application and associated application tasks. FIG. 2 illustrates a default arrangement of information elements to be used with one embodiment of the present invention.

In one embodiment, the petals display portion 224 might present an operation ring 220, a function ring 218, and the character pattern 200. In other embodiments, the petals display portion 224 might only present the operation ring 220, the function ring 218, or the character pattern 200, or only two of the aforementioned. The operation ring 220 and the function ring 218 display information elements associated with computer control tasks. In accordance with an embodiment of the present invention, information elements of the operation ring 220 and the function ring 218 are selected through either a drag-in, a drag-out, a dial, or an out-return stroke. The drag-in, drag-out, and dial strokes are discussed in FIGS. 7A, 7B, and 8. Operation ring 220 and function ring 218 are functionally generated for each instance associated with the sensor pattern 100 and defined by the prior task performed. Likewise, character pattern 200 is functionally generated and defined for each instance associated with the sensor pattern 100.

Figure 4:
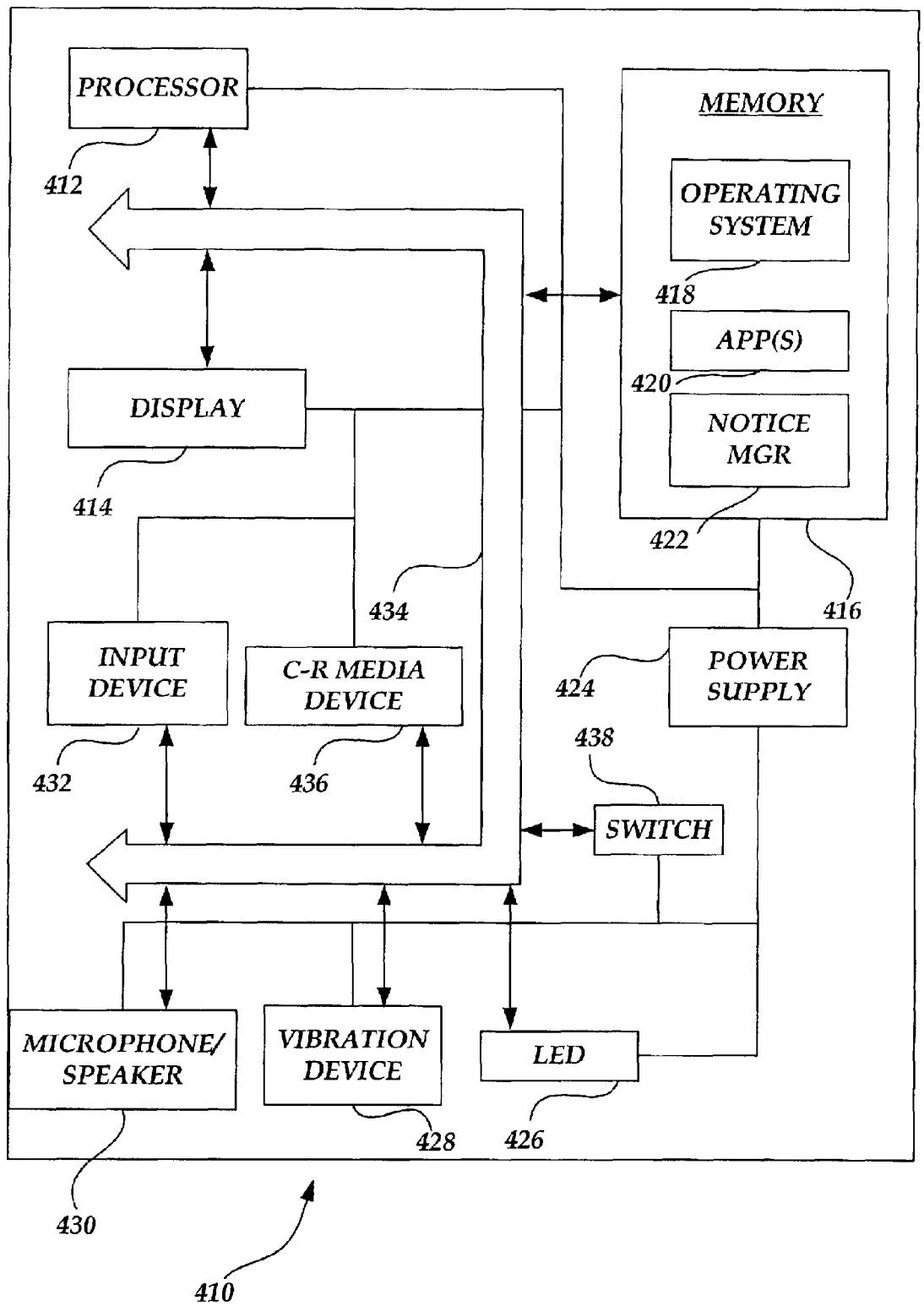
FIG. 4 illustrates an exemplary small computing device for operating in accordance with the various embodiments of the invention.

FIG. 4 illustrates an example of a suitable operating environment 410 in which embodiments of the invention may be implemented. The operating environment 410 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

FIG. 4 shows functional components of a small computing device 410 (such as 308). Various small computing devices may have all or some of the components illustrated in FIG. 4. The small computing device 410 has a processor 412, a memory 416, and an input device 432 (such as 304).

The memory 416 generally includes both volatile memory (e.g., RAM) and non-volatile memory (e.g., ROM, PCMCIA cards, etc.). An operating system (such as 302) is resident in memory 416 and executes on the processor 412. The small computing device 410 includes an operating system 418 (302 in FIG. 3), such as the Windows® CE operating system from Microsoft Corporation or other operating systems, including device-specific operating systems for the simple computing device.

One or more application programs 420 are loaded into memory 416 and run on the operating system 418. Examples of applications include telephony programs, e-mail programs, scheduling programs, PIM (personal information management) programs, word processing programs, spreadsheet programs, Internet browser programs, and so forth. The small computing device 410 also has a notification manager 422 loaded in memory 416. The notification manager 422 handles notification requests from the applications 420.

The small computing device 410 has a power supply 424 which is implemented as one or more batteries. The power supply 424 might further include an external power source that overrides or recharges the batteries mounted in the device. The external power source might include an AC adapter or a powered docking cradle.

The small computing device 410 is also shown with two types of external notification plus a microphone/speaker 430. The external notification devices are an LED 426 and a vibration device 428. In addition, the speaker in the microphone/speaker 430 may be used to provide audio notification. These notification devices are directly coupled to the power supply 424 so that, when activated, they remain on for a duration dictated by the notification mechanism. Switch 438 is controlled by the processor 432 to shut off power to conserve energy.

The small computing device 410 typically includes at least some form of computer readable media. Computer readable media can be any available media that can be accessed by small computing device 410. By way of example, and not limitation, computer readable media may comprise computer storage media and communication media. Computer storage media includes volatile and nonvolatile, removable and non-removable, media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by the small computing device 410. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The logical operations of the various embodiments of the present invention are implemented (1) as a sequence of computer implemented acts or program modules running on a computing system, and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof, without deviating from the spirit and scope of the present invention as recited within the claims attached hereto.

Figure 5:
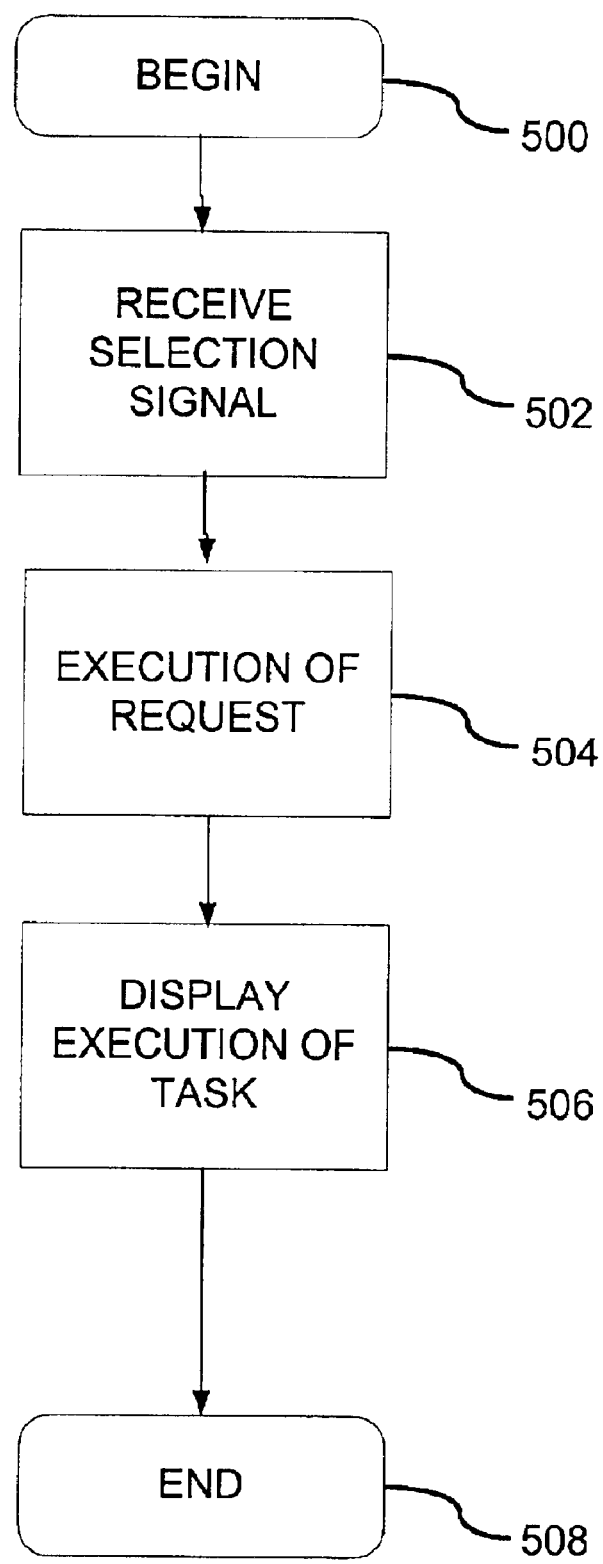
FIG. 5 generally illustrates operations for providing control and textual input to a computing system through the navigational interface in accordance with one embodiment of the present invention.

FIG. 5 generally illustrates operations of the navigational interface interpretation module 301 for providing computer input and control to a computing system 308 through the input device 304. The user inputs a request through selection stroke. A selection signal carrying selection stroke information associated with the selection of at least one information element referenced by a portion 102–120 of the sensor pattern 100 is sent to the interpretation module 301. In accordance with one embodiment of the present invention, the stroke may be a drag-in, a drag-out, a dial, an out-return, or a press/click stroke, which is applied by a press, or click, and an immediate lift on a petal 102 referencing an information element. The operation for providing computer input and control begins with start operation 500 once a selection signal is received by the sensor pattern 100.

Start operation 500 initiates the operation flow for providing computer input and control to a computing system 308 through the input device 304. Request operation 502 receives a selection signal from the input device 304. Once the selection signal is received, execution operation 504 interprets the selection stroke in the selection signal and performs the task associated with the user request. Display operation 506 presents the result of the performance of the task on the display 306.

In one embodiment, the task may be the entering or editing of a character into an application. In another embodiment, the task might be a control operation, such as application activation, operation of an active application, operation of a desktop environment utility, operation of an operating system, or overall computer control. In yet another embodiment, the task might be the generation of updated information elements on the display pattern 201. At any rate, display operation 506 displays the implementation of a task (textual, or operational) in the computing system 308 or the generation of updated information elements for the display pattern 201, or both. In one embodiment, display operation 506 only displays the implementation of a task on the computing system 308 while keeping the display pattern 201 hidden from the view of the user. Following display operation 506, finish operation 508 terminates operation flow.

Figure 6:
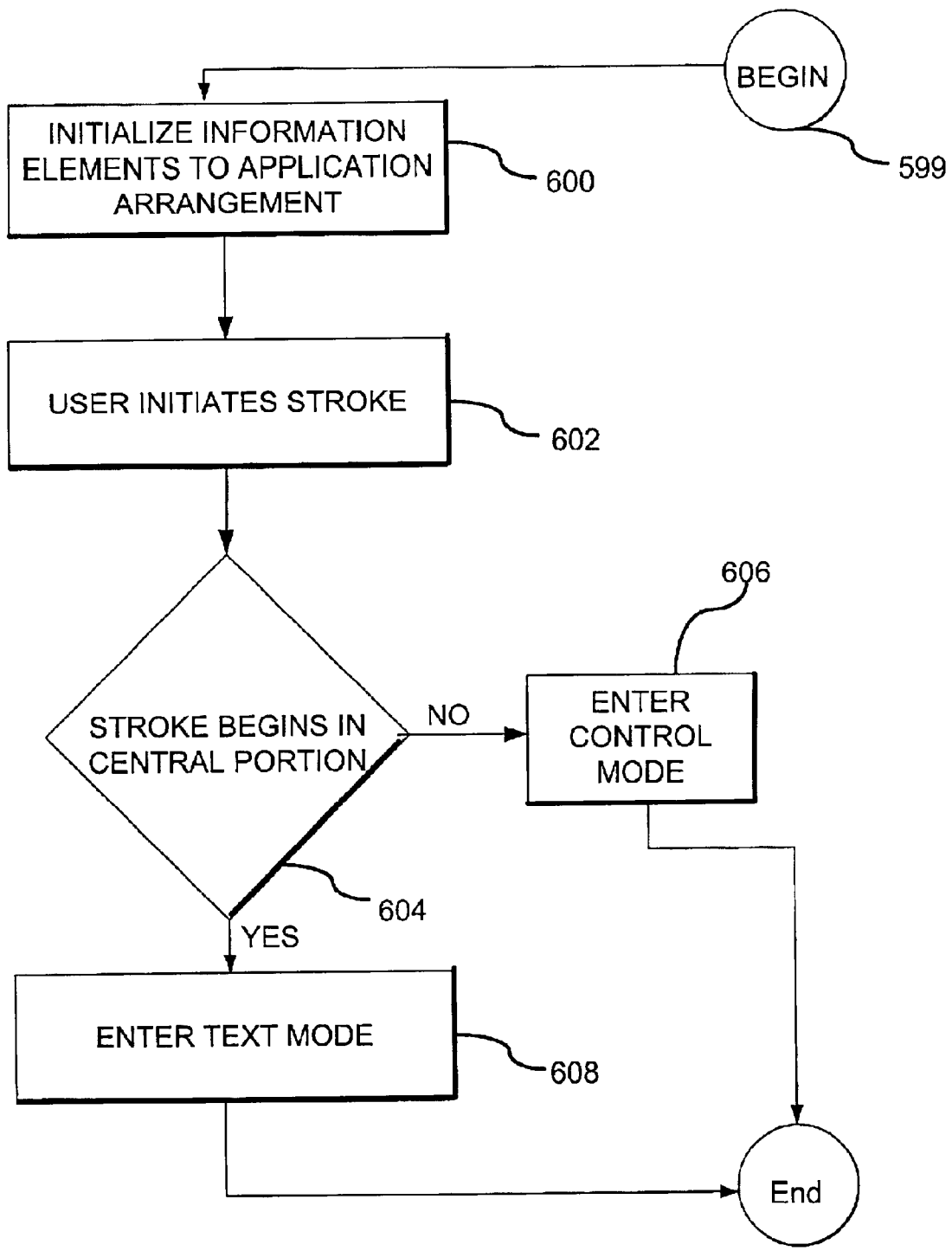
FIG. 6 illustrates operations of a navigational interface as it interacts with an input device to control a computing device in accordance with one embodiment of the present invention.

FIG. 6 further illustrates operations performed by the navigational interface interpretation module 301 receiving input from the input device 304 and providing computer control and textual character input to a computing system 308. In particular, FIG. 6 further describes the operations of receive operation 502 once a selection signal is received at the navigational interface interpretation module 301. Although FIGS. 6–9, which further illustrate the conceptual illustration of FIG. 5, are described in reference to a touchpad as the input device 304, other embodiments, such as the various input devices mentioned while describing FIG. 5, might be used to transmit selection signals to the navigational interface interpretation module 301.

The operational flow of FIG. 6 illustrates user selection of one of two modes of the navigational interface interpretation module 301. Selection of the mode is determined by the initial sensory portion 102–120 of the selection stroke on the sensor pattern 100. FIGS. 7A, 7B, 8 and 9 elaborate on FIG. 6, thus providing further detail of the operations performed during execution operation 504. Default operation 600 initializes the default information elements referenced by portions 102–120 of the sensor pattern 100 to an application arrangement incorporating the display pattern of FIG. 2. In accordance with one embodiment, the application arrangement displays the operation ring 220 and the function ring 218 containing menu items and information elements associated with tasks and operations of the primary active application running on the computing system. As mentioned earlier, the navigational interface 300 may be either the primary user interface or a navigational user interface operating on a GUI.

Figure 7A:
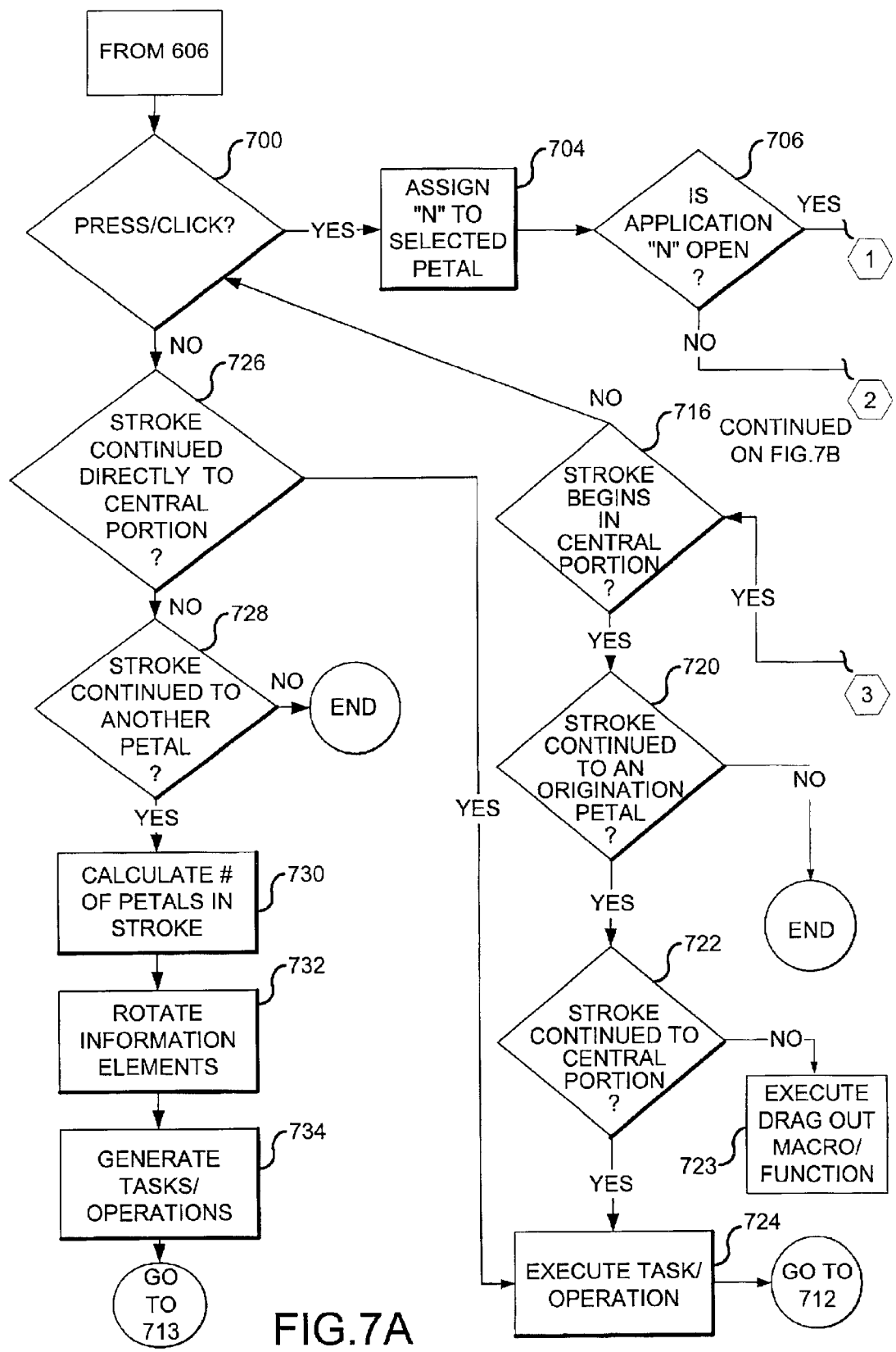
FIGS. 7A and 7B illustrate operations of a navigational interface interpretation module in the navigation mode of FIG. 6 as it interacts with an input device to control operations of the computing device.
Figure 7B:
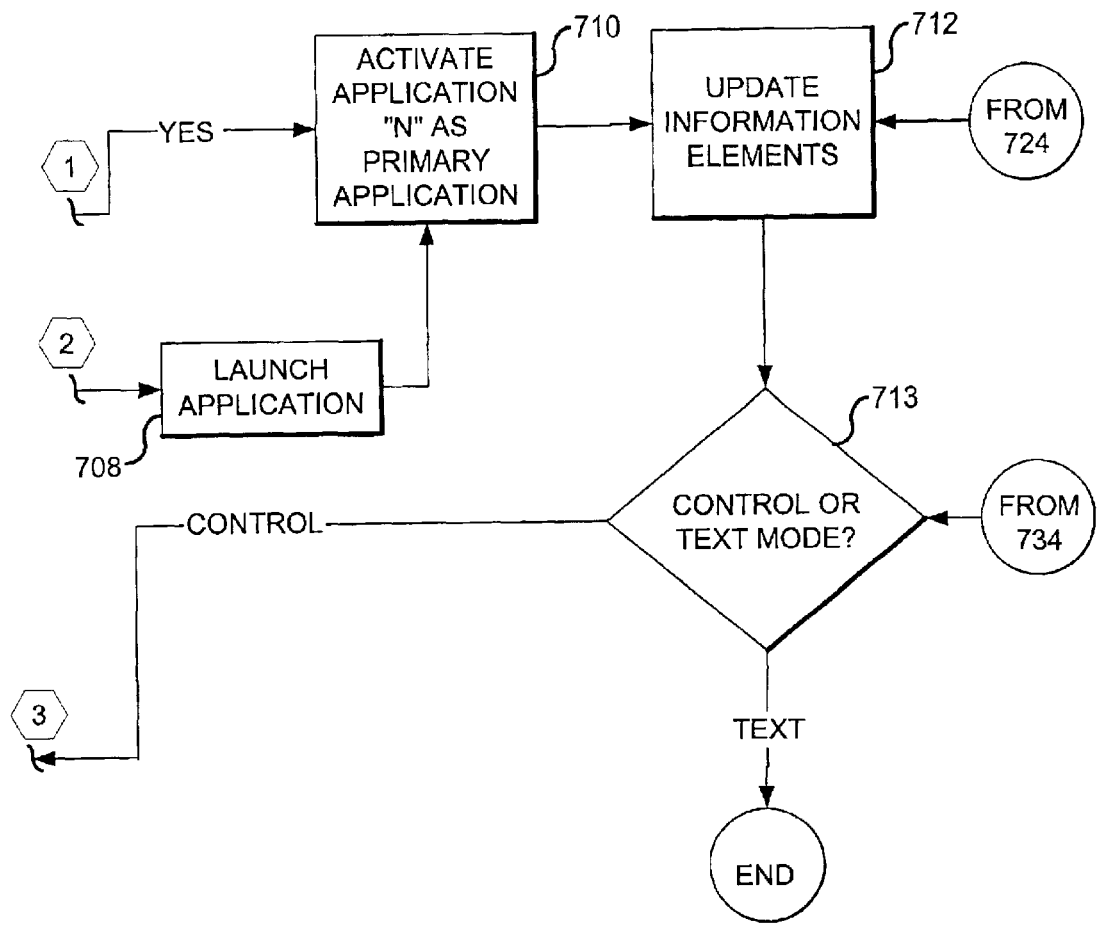
Figure 8:
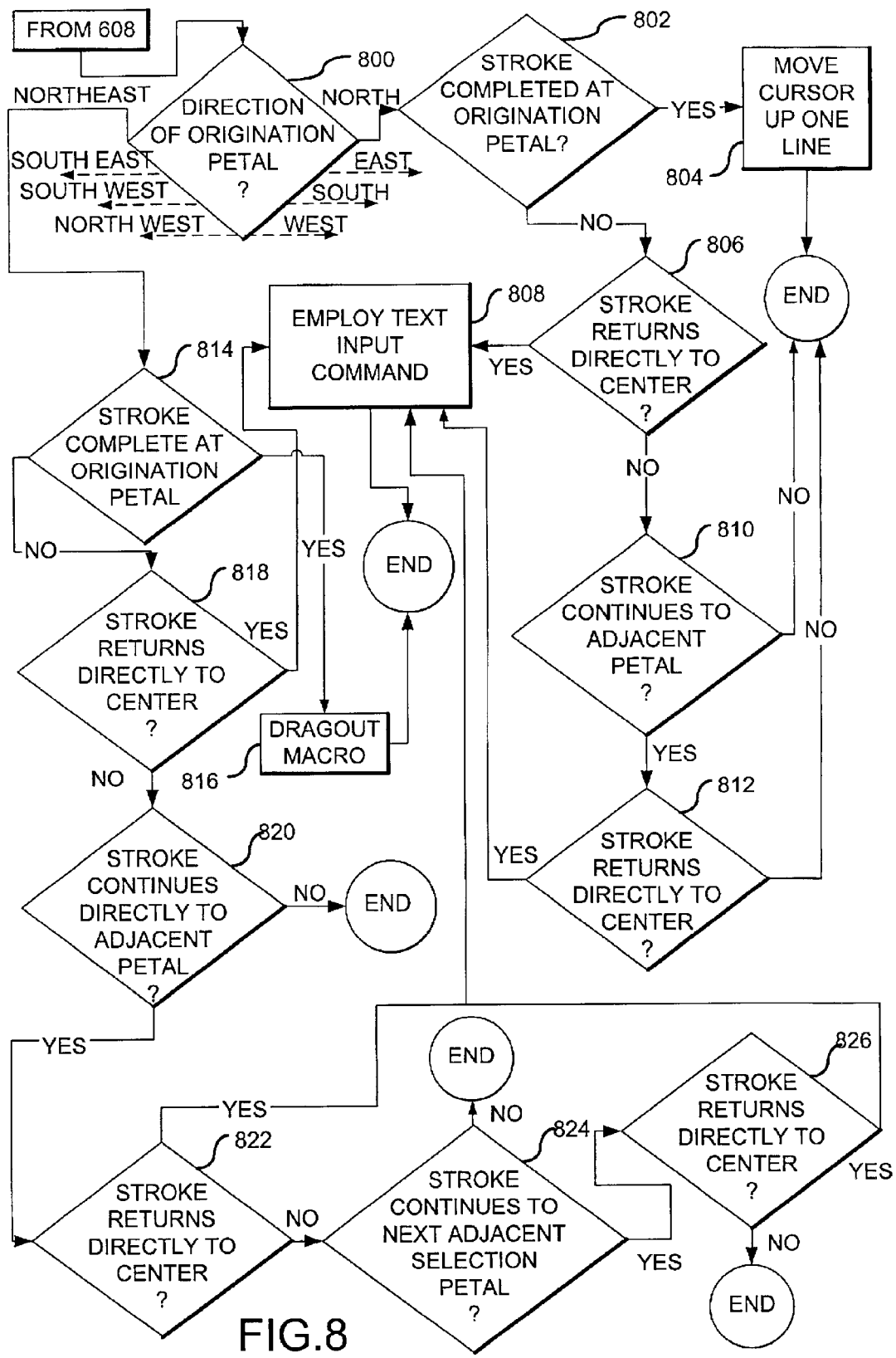
FIG. 8 illustrates operations of the navigational interface interpretation module in text-operating mode of FIG. 6 as it interacts with the input device to input and edit text into various applications operating on the computing system.

Start detect operation 602 detects the sensory portion where the selection stroke begins. Central portion detect operation 604 tests whether the stroke begins on the central sensory portion 120 of the sensor pattern 100. If the stroke begins on the central sensory portion 120, then text mode operation 608 activates the text-operating mode for text inputting and editing. FIG. 8 shows an embodiment of the operational flow of the text-operating mode of the navigational interface interpretation module 301 wherein the sensor pattern 100 is used to select information elements related to text input and editing. If central portion detect operation 604 determines that the selection stroke begins on a sensory portion 102–118 other than the central sensory portion 120, then control mode operation 606 activates the control-operating mode of the navigational interface interpretation module 301. FIGS. 7A and 7B show an embodiment of the operational flow of the control mode of the navigational interface interpretation module 301 wherein the sensor pattern 100 is used to select information, or control, elements related to computer control. Once either the text-operating mode or the control-operating mode is complete, as described below in FIGS. 7A, 7B and 8, operation flow is terminated and returns to a main program flow.

Figure 9:
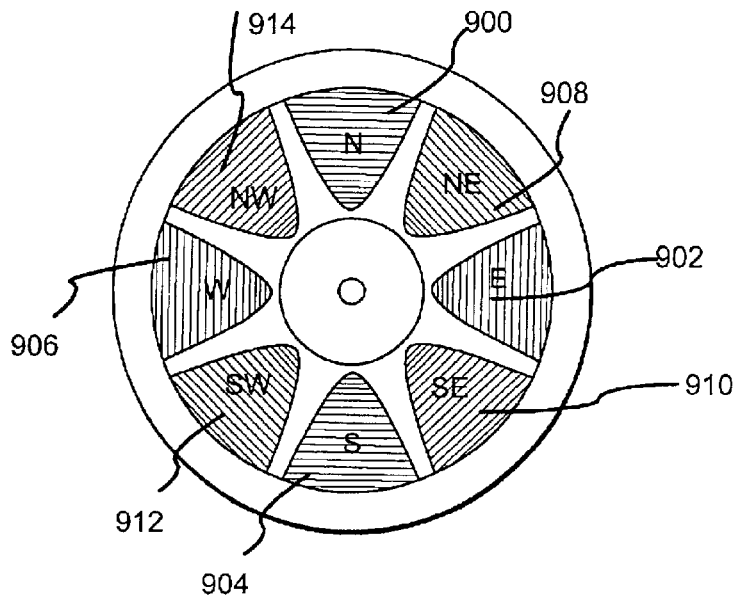
FIG. 9 illustrates one directional orientation of the sensor pattern as interpreted by the operational flow of FIG. 8.

In the text-operating mode, the primary task is the entering of text and character inputs through a selection stroke selecting text elements. FIG. 8 illustrates various text selection strokes selecting textual tasks associated with textual input in accordance with one embodiment of the present invention. Direction operation 800 in FIG. 8 determines which direction the selection stroke continues from the central sensory portion 120. In referencing the direction, the top petal 102 of the sensor pattern 100 is due north in accordance with one embodiment. FIG. 9 is an illustration of one embodiment of the invention showing the directional orientation of the sensor pattern 100 used in the operation flow of FIG. 8. If the origination petal (the first petal selected in the stroke) is the north petal 900 (FIG. 9), as determined by direction operation 800, then operation flow passes to lift operation 802. Lift operation 802 determines whether the stroke is terminated at the origination petal. In one embodiment wherein the input device 304 is a touchpad, the stroke is completed if the user lifts his finger from the touchpad. If the stroke is completed, then the stroke is a drag-out stroke, and operation flow passes to cursor operation 804. Cursor operation 804 moves the cursor in the text editor up one line. Once the cursor is moved up one line, operation flow is terminated. If the stroke is not completed, as determined by lift operation 802, return operation 806 determines whether the stroke continues from the origination petal directly to the central sensory portion 120. If the stroke returns directly to the central sensory portion 120, then the stroke is an out-return stroke and operation flow passes to the text input operation 808. Text input operation 808 employs the specific textual command or character in accordance with the Qwickwriting™ technique (referenced above). Once the text is entered, operation flow is terminated.

If the stroke does not return directly to the central sensory portion 120, but instead continues to an adjacent selection petal (a petal adjacent to the origination petal), as determined by rotation operation 810, then operation flow passes to a second return operation 812. The second return operation 812 determines whether the stroke has continued from the adjacent selection petal directly to the central sensory portion 120. If the stroke returns directly to the central sensory portion 120, then operation flow passes to the text input operation 808. If the stroke does not return directly to the central sensory portion 120 or if rotation operation 810 determines that the stroke did not continue directly to an adjacent petal, then operation flow is terminated without successfully completing an input operation.

If directional operation 800 determines that the origination petal is either the east 902 (FIG. 9), south 904 (FIG. 9), or west 906 (FIG. 9) petal, then text-operating mode operates in the same operational flow; however, if the stroke is completed at the origination petal, then cursor operation 804 will move the cursor in the direction of the origination petal. For example, if the origination petal is the east petal 902, then cursor operation 804 (if enabled) moves the cursor one character space to the right. Likewise, if the origination petal is the south petal 904, then cursor operation 804 (if enabled) moves the cursor one line down. Finally, if the origination petal is the west petal 906, then cursor operation 804 (if enabled) moves the cursor one character to the left.

If the origination petal is the northeast 908 (FIG. 9), the southeast 910 (FIG. 9), southwest 912 (FIG. 9), or northwest 914 (FIG. 9) petal as determined by direction operation 800, then operation flow passes to lift operation 814. Lift operation 814 determines whether the selection stroke is completed at the origination petal. In an embodiment where the input device 304 is a touchpad, the stroke is completed if the user lifts his finger from the touchpad. If the stroke is completed, then the stroke is a drag-out stroke and operation flow passes to drag-out operation 816. Drag-out operation 816 performs the drag-out task of invoking drag-out functions of the textual input technique for the specific macro or function associated with the information element referenced by the origination petal. Once execution of the macro or function is complete, operation flow is terminated. If the stroke is not completed, as determined by lift operation 814, return operation 818 determines whether the selection stroke continues from the origination petal directly to the central sensory portion 120. If the stroke returns directly to the central sensory portion 120, then the stroke is an out-return stroke and operation flow passes to the text input operation 808. Text input operation 808 employs the specific Qwickwriting™ command or character in accordance with the Qwickwriting™ technique (referenced above). Once text is entered, operation flow is terminated.

If the stroke does not return directly to the central sensory portion 120 but instead continues to an adjacent selection petal, as determined by rotation operation 820, then operation flow passes to a second return operation 822. The second return operation 822 determines whether the stroke has continued from the adjacent selection petal directly to the central sensory portion 120. If the stroke returns directly to the central sensory portion 120, then the stroke is an out-return stroke and operation flow passes to the text input operation 808. If rotation operation 820 determines that the stroke did not continue directly to an adjacent petal, then operation flow is terminated without successfully completing an input operation.

If the second return operation 822 determines that the stroke did not continue directly to the central sensory portion 120, then operation flow passes to a second rotation operation 824. Second rotation operation 824 determines whether the stroke continued directly from the adjacent selection petal to a next adjacent selection petal (a petal adjacent to the adjacent selection petal). If the stroke did not continue directly to the next adjacent selection petal, then operation flow is terminated without successfully completing an input operation.

If the second rotation operation 824 determines that the stroke continues directly to the next adjacent selection petal, then operation flow is passed to a third return operation 826. The third return operation 826 determines whether the stroke has continued from the next adjacent selection petal directly to the central sensory portion 120. If the stroke returns directly to the central sensory portion 120, then the stroke is an out-return stroke and operation flow passes to the text input operation 808. If the stroke does not return directly to the central sensory portion 120, then operation flow is terminated without successfully completing an input operation.

While the text-operating mode has been described using direction sensing between sensory portions, other sensing operations might be used to detect the type of selection stroke. For example, each sensory portion itself might indicate when it included a stroke. Then the type of stroke could be detected by the sequence of sensory portions included in the selection stroke.

Referring back to FIG. 6, if central portion detect operation 604 detects that the selection stroke begins on a sensory portion 102–118 other than the central sensory portion 120, then control mode operation 606 activates the control-operating mode of the navigational interface interpretation module 301. FIGS. 7A and 7B show an embodiment of the operational flow of the control-operating mode of the navigational interface interpretation module 301 wherein the sensor pattern 100 is used to select information elements related to control operations. Once the control-operating mode is complete, as described below in FIGS. 7A and 7B, operation flow is terminated and returns to the main program flow.

In the control-operating mode, the primary task is to enter control operations associated with the operating system 308 and applications installed thereon through a selection stroke selecting control elements. Whereas selection of application activation control elements activate applications installed on the computing system 308, selection of application operation control elements activates control operations of applications installed on the computing system 308. FIGS. 7A and 7B illustrate various control strokes selecting control operation tasks associated with application activation and operation in accordance with one embodiment of the present invention. Referring to FIGS. 7A and 7B, the control-operating mode of the navigational interface interpretation module 301 is entered through the operation flow of FIG. 6. Lift operation 700 determines whether the selection stroke continues from the initial sensory portion 102–120 to any other sensory portion 102–120 of the sensor pattern 100. If the stroke is completed without continuing to another sensory portion 102–120, then the stroke is a press/click stroke and operation flow passes to selection operation 704. Selection operation 704 assigns a variable, n, to the petal 102 selected. Status operation 706 determines whether the application linked to petal n is an application already opened on the desktop environment. If status operation 706 concludes that the application is not opened, then launch operation 708 calls the executable file of the application in order to launch the application. If the application is open, as determined by status operation 706, or once the application is launched by launch operation 708, activation operation 710 performs the press task of activating the application as the primary active application operating through the user interface. The application activated by the activation operation 710 might be an application program, or a desktop environment or operating system utility providing functionality to control operations on the computing system 308.

Information operation 712 generates updated information elements referenced by the portions 102–120 of the sensor pattern 100. If the display pattern 201 is active, then the updated information elements are presented on the display pattern 201. Control operation 713 determines whether the tasks represented by the updated information elements are associated with either the control-operating mode or the text-operating mode of the navigational interface interpretation module 301. If the information elements are associated with the control-operating mode, then operation flow passes to touch operation 716. If the information elements are associated with the text-operating mode, then operation flow is terminated.

Touch operation 716 determines whether a subsequent selection stroke, which is identified by a selection signal other than the signal sensed by sensory operation 602, has originated in the central sensory portion 120 of the sensor pattern 100. If the subsequent stroke has not originated in the central sensory portion 120, operation flow passes to lift operation 700 and continues in the control-operating mode as described earlier. If the subsequent stroke is initiated in the central sensory portion 120, then subsequent stroke operation 720 is enabled. Subsequent stroke operation 720 determines whether the subsequent stroke has continued from the central sensory portion 120 directly to an origination petal. If the subsequent stroke has not continued directly to an origination petal, then operation flow is terminated without completion of any input commands. If the subsequent stroke has continued directly to an origination petal, subsequent stroke operation 720 enables return operation 722. Return operation 722 determines whether the subsequent stroke has continued directly from the origination petal to the central sensory portion 120. If the subsequent stroke has not continued directly to the central sensory portion 120, then the subsequent stroke is a drag-out stroke and operation flow passes to drag-out operation 723. Drag-out operation 723 invokes the drag-out functions of the textual input technique for the specific macro or function associated with the information element referenced by the origination petal. Once execution of the macro or function is complete, operation flow is terminated. If the subsequent stroke continues to the central sensory portion 120, as determined by return operation 722, execution operation 724 performs the task associated with the information element referenced by that petal 104–118 of the sensor pattern. After the task is performed, control-operating mode is initialized to information operation 712 and operation flow continues as earlier discussed.

If it is determined in lift operation 700 that the stroke continued to another sensory portion 102–120, then drag operation 726 is enabled. Drag operation 726 determines whether the stroke has continued directly to the central sensory portion 120. If the stroke has continued directly to the central sensory portion 120, then the stroke is a drag-in stroke and operation flow passes to execution operation 724. Execution operation 724 performs the drag-in task associated with the information element referenced by that petal 104–118 of the sensor pattern 100. After the task is performed, the control-operating mode is initialized to information operation 712 and operation flow continues as earlier discussed.

If it is determined in drag operation 726 that the stroke has not continued to the central sensory portion 120, then petal operation 728 is enabled. Petal operation 728 determines whether the stroke has continued to another petal 102. If the user has continued the stroke to another petal 102, then the stroke is a dial stroke and operation flow passes to calculation operation 730. If the stroke has not continued to another petal 102, then operation flow is terminated without successfully completing an input operation.

Calculation operation 730 calculates the number of sensory petals 104–118 contained in the dial stroke. Once calculation operation terminates, rotation operation 732 performs the dial task of rotating the information elements referenced by the sensor pattern 100 in the direction (clockwise or counterclockwise) and number of sensory petals 104–118 as calculated by the calculation operation 730. By rotating the information elements, users can dictate which task is represented as the primary menu item 508 associated with the sensor pattern 100. In the embodiment described in FIG. 2, a menu item 508 is an information element on either the operation ring 220, the function ring 218, or any portion 102–118 defining information elements referenced by portions 102–120 and rings 218, 220 inside the portion 102–118 or ring 218, 220 associated with the menu item 508. In another embodiment, a menu item 508 may be an information element on the operation ring 220. Accordingly, update operation 734 generates information elements material to the task that is now the primary task on either the operation ring 220 or the function ring 218. If the display pattern 201 is active, then the updated information elements are presented on the display pattern 201. Following update operation 734, the navigational interface interpretation module 301 initializes the control-operating mode to control operation 713 and operation flow continues as earlier discussed.

Figure 10:
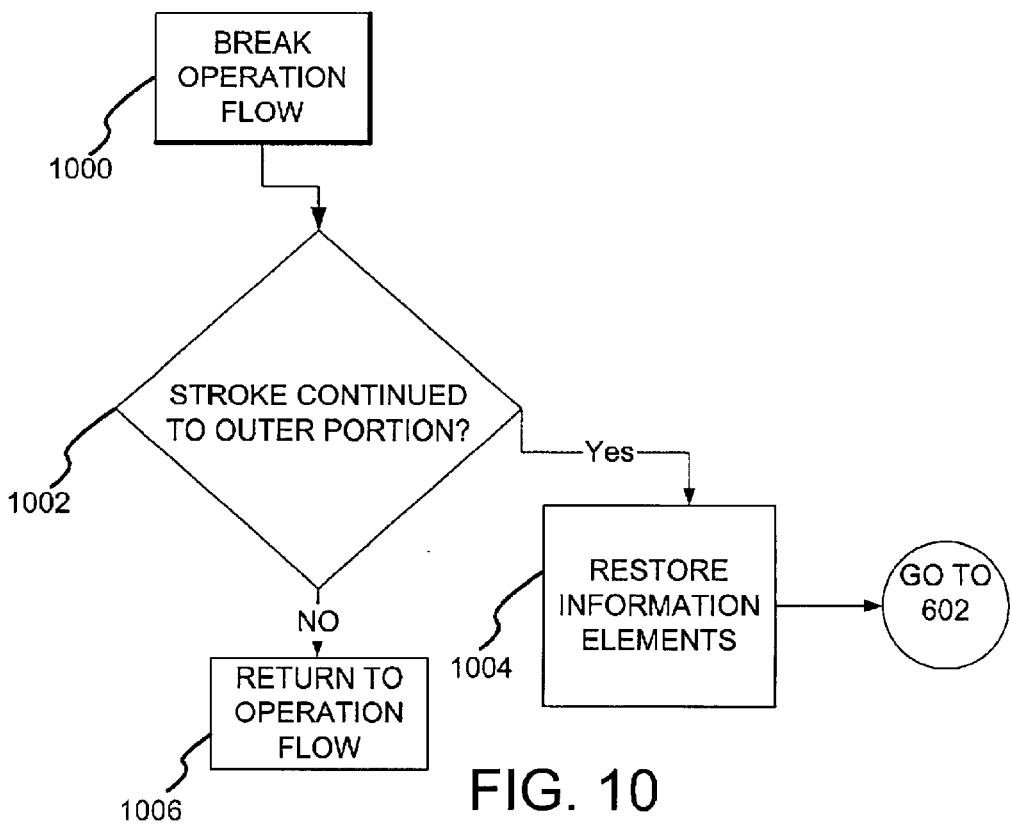
FIG. 10 illustrates operations associated with a cancel lip of the sensor pattern used to abort an input command during an input stroke in accordance with one embodiment of the present invention.

In one embodiment of the present invention, the outer, or circumferential, sensory portion 102 is used as a cancel lip to abort a command in the middle of a stroke. FIG. 10 is an illustration of a stroke cancel operation in accordance with one embodiment of the invention. The operational flow of FIG. 10 may be used in all operations of FIGS. 7 and 8 wherein the user is currently performing a stroke. In essence, the operational flow of FIG. 10 resets the information elements referenced by portions 102–120 of the sensor pattern 100 to the immediate previous instance. An instance is a momentary portrayal of the information elements referenced by the sensor pattern 100 immediately prior to the performance of a task.

Receive operation 1000 breaks operation flow and passes operation flow to abort operation 1002. Abort operation 1002 determines whether the selection stroke has continued from any portion 104–120 to the outer sensory portion 102. If the stroke has been extended to the outer sensory portion 102, then reset operation 1004 restores the information elements of the immediate previous instance and operation flow passes to sensory operation 602. If the stroke has not been extended to the outer circumferential sensory portion 102, then transmit operation 1006 returns operation flow to the point where it was interrupted by receive operation 1000.

Although the invention has been described in language specific to computer structural features, methodological acts and computer readable media, it is to be understood that the invention defined in the appended claims is not necessarily limited to the specific structures, acts or media described. As an example, other textual input methods may be included in the user interface in combination with the tactile input device. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. In a computing system, a navigational interface for inputting text and control information into the computing system, the navigational interface comprising:

an input pointer generating a selection stroke when operated by the user, the selection stroke indicative of a request to enter text or to perform a task in the computing system;

a sensor pattern device radially divided into a plurality of sensory portions, the sensor pattern device detecting the selection stroke and identifying at least one selected sensory portion included in the selection stroke; and a first information element associated with a task to be performed in the computing system and referenced by one of the plurality of sensory portions;

a second information element associated with text to be entered in the computing system and referenced by one of the plurality of sensory portions; and at least one selected sensory portion selected by the selection stroke, whereby information entering text in the computing system and requesting performance of a particular task by the computing system is input by the selection stroke; and an interface interpretation module recognizing the selection stroke on the sensor pattern and entering the text or performing the task associated with the selected information element; and wherein the sensor pattern comprises:
   a central sensory portion forming a single sensory portion;
   a petals sensory portion angularly divided into sensory petals distributed about the central sensory portion, each sensory petal forming a single sensory portion; and
   an outer sensory portion associated with the sensory petals so that circumferential parts of the outer sensory portion are associated with individual sensory petals; and wherein the selection stroke begins at a sensory petal and continues to at least one other sensory portion of the sensor pattern whereby the information input into the computing system is task information controlling operations in an application installed on the computing system; and wherein the other sensory portion is the central sensory portion whereby the information input into the computing system is a drag task executing an operation of the application.

2. In a computing system, a navigational interface for inputting text and control information into the computing system, the navigational interface comprising:

an input pointer generating a selection stroke when operated by the user, the selection stroke indicative of a request to enter text or to perform a task in the computing system;

a sensor pattern device radially divided into a plurality of sensory portions, the sensor pattern device detecting the selection stroke and identifying at least one selected sensory portion included in the selection stroke; and a first information element associated with a task to be performed in the computing system and referenced by one of the plurality of sensory portions;

a second information element associated with text to be entered in the computing system and referenced by one of the plurality of sensory portions; and at least one selected sensory portion selected by the selection stroke, whereby information entering text in the computing system and requesting performance of a particular task by the computing system is input by the selection stroke; and an interface interpretation module recognizing the selection stroke on the sensor pattern and entering the text or performing the task associated with the selected information element; and wherein the sensor pattern comprises:
   a central sensory portion forming a single sensory portion;
   a petals sensory portion angularly divided into sensory petals distributed about the central sensory portion, each sensory petal forming a single sensory portion; and
   an outer sensory portion associated with the sensory petals so that circumferential parts of the outer sensory portion are associated with individual sensory petals; and wherein the selection stroke begins at a sensory petal and continues to at least one other sensory portion of the sensor pattern whereby the information input into the computing system is task information controlling operations in an application installed on the computing system; and wherein the selection stroke begins at a sensory portion other than the outer sensory portion and continues to the outer sensory portion whereby the information input into the computing system is a cancel task initializing the plurality of information elements to an immediate previous instance.

3. The navigational interface according to claim 2 wherein the sensor pattern device is a touchpad having a surface and the selection stroke comprises:

a press on a first selected sensory portion on the surface of the touchpad;

a slide from the first selected sensory portion to at least one other selected sensory portion; and a lift from the surface of the touchpad whereby the selection stroke is indicative of a touch, slide, and lift, and the selection stroke includes at least two selected sensory portions, begins at the first selected sensory portion, and ends at the other selected sensory portion.

4. The navigational interface according to claim 2 wherein the sensor pattern device is a touchpad having a surface and the selection stroke comprises:

a press on a selected sensory portion on the surface of the touchpad; and a lift from the surface of the touchpad at the same selected sensory portion whereby the selection stroke is indicative of a touch and lift at one selected sensory portion.

5. The navigational interface according to claim 2 wherein the input pointer is a mouse having at least one button for press and lift and the sensor pattern device is a display device.

* * * * *